US009187053B2

(12) United States Patent
Nusier et al.

(10) Patent No.: US 9,187,053 B2
(45) Date of Patent: Nov. 17, 2015

(54) ADVANCED ENGAGEMENT SMALL OVERLAP DEFLECTOR

(71) Applicant: Ford Global Technologies, LLC, Dearborn, MI (US)

(72) Inventors: Saied Nusier, Canton, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/101,812

(22) Filed: Dec. 10, 2013

(65) Prior Publication Data

US 2015/0158441 A1     Jun. 11, 2015

(51) Int. Cl.
| | | |
|---|---|---|
| *B62D 7/22* | (2006.01) |
| *B60R 19/16* | (2006.01) |
| *B62D 21/15* | (2006.01) |
| *B62D 25/08* | (2006.01) |
| *B60R 19/34* | (2006.01) |

(52) U.S. Cl.
CPC ............... *B60R 19/16* (2013.01); *B60R 19/34* (2013.01); *B62D 21/152* (2013.01); *B62D 25/082* (2013.01)

(58) Field of Classification Search
CPC .... B62D 21/152; B62D 25/082; B62D 25/02; B62D 25/2036; B60R 19/00; B60R 19/16; B60R 19/26; B60R 19/34; B60R 2019/007; B60R 2021/0023
USPC ........... 296/187.09, 203.01, 204, 193.07, 132
See application file for complete search history.

(56) References Cited

U.S. PATENT DOCUMENTS

| | | | | |
|---|---|---|---|---|
| 6,511,119 | B2 * | 1/2003 | Takase et al. ............ | 296/187.09 |
| 6,866,115 | B2 * | 3/2005 | Miyasaka ................... | 180/311 |
| 7,080,875 | B2 | 7/2006 | Kim | |
| 7,819,218 | B2 | 10/2010 | Eichberger et al. | |
| 7,900,995 | B2 * | 3/2011 | Sato et al. .................. | 296/187.1 |
| 7,926,847 | B2 * | 4/2011 | Auer et al. .................... | 280/784 |

(Continued)

FOREIGN PATENT DOCUMENTS

| | | |
|---|---|---|
| JP | 2002205662 | 7/2002 |
| KR | 20020039863 | 5/2002 |

OTHER PUBLICATIONS

Tony Norton, Small Overlap, Big Challenge, Altair Simulate to Innovate, Jun. 2013.

(Continued)

*Primary Examiner* — Glenn Dayoan
*Assistant Examiner* — Sunsurraye Westbrook
(74) *Attorney, Agent, or Firm* — Raymond L. Coppiellie; Brooks Kushman P.C.

(57) ABSTRACT

A deflector is provided for a vehicle having a bumper that is connected to a frame rail through a crush-can. The deflector includes an engagement portion that extends laterally outward and forward of the frame rail. The engagement portion is attached by an attaching portion to the frame rail at a front location behind the crush-can. A small overlap collision support portion extends from the engagement portion toward a collision loading location on the frame rail behind the front location. The deflector has a front leg that is connected through an intermediate leg to a rear leg. The front leg is attached to the frame rail and the rear leg is unattached to the frame rail, but disposed to apply a lateral load to the side of the frame rail in a small overlap rigid barrier test.

20 Claims, 5 Drawing Sheets

(56) References Cited

U.S. PATENT DOCUMENTS 8,042,640 B2 * 10/2011 Namiki .................. 180/219
2012/0248820 A1 10/2012 Yasui et al.

OTHER PUBLICATIONS

Cheryl Jensen, Forester is a Standout in Latest Crash Test, The New York Times, Automobiles, May 16, 2013.

* cited by examiner

ADVANCED ENGAGEMENT SMALL OVERLAP DEFLECTOR

TECHNICAL FIELD

This disclosure relates to a frame rail, crush can or subframe mounted apparatus for reducing intrusions into a passenger compartment of a vehicle as tested in a small overlap rigid barrier test.

BACKGROUND

Land vehicles are tested for crashworthiness by a variety of tests including frontal impacts, side impacts, rear impacts, roll-over and other tests. Full frontal impact tests were previously developed that specified that a vehicle impacts a barrier between the frame rails that extend longitudinally relative to the vehicle. In a full frontal impact test, the frame rails provide the primary support for the vehicle body.

A test promulgated by the Insurance Institute for Highway Safety (IIHS) simulates small overlap frontal crashes against a rigid barrier. In the proposed test, the vehicle impacts a rigid barrier having a six inch pole-like radius on one corner with a 25% overlap at 40 MPH. The impact is outboard of the frame rails and, as a result, the frame rails do not provide as much resistance to intrusion into the passenger compartment as in the case of impacts between the frame rails. The extent of any intrusions into the passenger compartment are measured at the lower hinge pillar, footrest, left toepan, brake pedal, parking brake pedal, rocker panel, steering column, upper hinge panel, upper dash, and left IP.

One problem with adding deflectors to a vehicle is that the deflectors may interfere with the performance of impact absorption systems such as crush-cans that are used to minimize the effects of a full-frontal impact. In the case of impacts in between the frame rails, crush-cans and/or frame rails are designed to deform in an accordion fashion to maximize impact energy absorption. Deflectors addressing small overlap impacts can interfere with the accordion deformation of the crush-cans located in front of the frame rails. Modifications of vehicle design to address small over-lap impacts should minimize any effect on other impact modes.

Additional reduction of intrusions in the small overlap rigid barrier (SORB) test results are desired that are simple and cost effective.

This disclosure is directed to solving the above problems and other problems as summarized below.

SUMMARY

According to one aspect of this disclosure, a deflector is provided for a vehicle having a bumper connected to a frame rail through a crush-can. The deflector comprises a front leg attached to the frame rail adjacent the crush-can and extending forward of the frame rail. An intermediate leg is attached to a front end of the front leg and extends in a rearward and outward direction. A rear leg extends from an outer end of the intermediate leg toward the frame rail.

According to other aspects of this disclosure, the rear leg may have a back end that is not attached to the frame rail and is disposed adjacent the frame rail. The front leg may extend toward a front outer corner of the vehicle. The front leg may extend at an oblique angle relative to the frame rail to a point laterally outboard of the crush-can that is rearward of the bumper. The intermediate leg may be attached at a right angle to the front leg and to the rear leg.

A front triangular plate may be provided that is disposed in a horizontal plane and attached to the deflector at a first intersection joining the front leg and the intermediate leg. A rear triangular plate may be disposed in the horizontal plane and attached at a second intersection joining the intermediate leg and the rear leg.

According to another aspect of this disclosure, a deflector is provided for a vehicle having a frame rail and a bumper. The deflector may comprise a front leg attached at a location in longitudinal alignment with the frame rail. An intermediate leg is attached to the front leg to form a first V-shape portion of the deflector disposed outboard and forward of the frame rail. A rear leg extends toward the frame rail and forms a second V-shaped portion with the intermediate leg.

According to another aspect of this disclosure, a small overlap collision absorption deflector is provided for a vehicle having a bumper connected to a frame rail through a crush-can. The deflector comprises an advanced engagement portion attached to the frame rail behind the crush-can and extending laterally outward and forward of a back end of the crush-can. A support portion extending from the advanced engagement portion toward a location on the frame rail spaced from the engagement portion.

According to other aspects of this disclosure relating to the small overlap collision absorption deflector, the support portion may have an end facing the location on the frame rail that is driven into engagement with the frame rail in a collision with an offset object that is longitudinally aligned with the deflector. The end of the support portion is oriented to be not driven into the frame rail in a full-frontal collision.

An impact force applied in a collision with an object longitudinally aligned with the deflector is applied to the engagement portion with the impact force being partially applied through the support portion to the frame rail. The impact force applied in a collision with an object longitudinally aligned with the deflector is applied to the engagement portion with the impact force being partially absorbed by deformation of the engagement portion.

The engagement portion extends toward a front outer corner of the vehicle. The deflector may further include a plate disposed in a horizontal plane that is attached to the deflector and interconnects the engagement portion and the support portion.

The above aspects and other aspects of this disclosure will be described in greater detail below with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
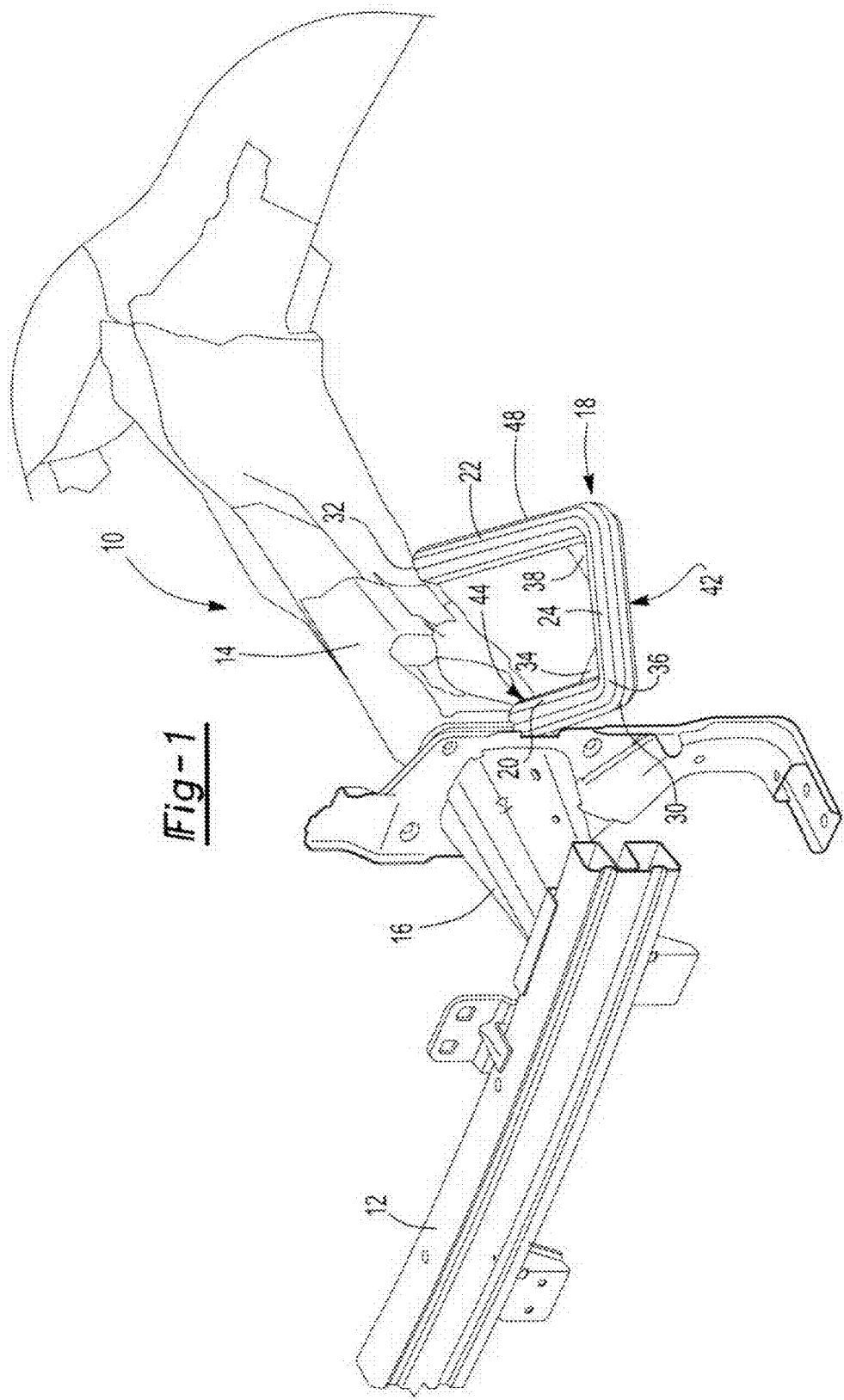
FIG. 1 is a front perspective view of a deflector attached to the front end of a frame rail of a vehicle that is oriented for advanced engagement with a small overlap rigid barrier.
Figure 2:
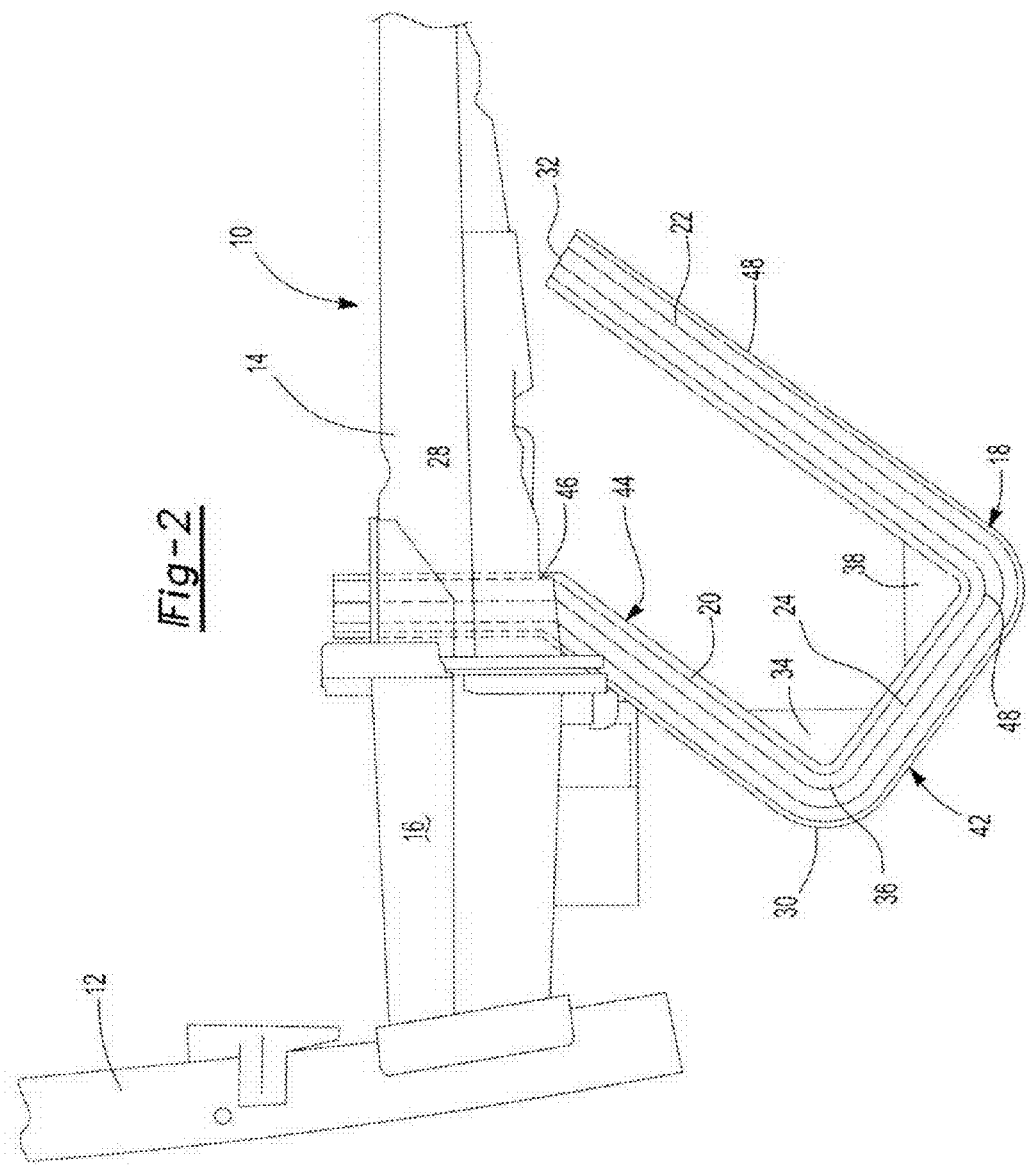
FIG. 2 is a top plan view of a deflector attached to the front end of a frame rail of a vehicle that is oriented for advanced engagement with a small overlap rigid barrier.

Referring to FIGS. 1 and 2, a vehicle 10 is illustrated that includes a bumper 12 that is attached to a frame rail 14 through a crush-can 16. At least one crush-can 16 is provided on each side of the vehicle for absorbing the impact of front end collisions that involve an object contacting the bumper 12 between the frame rails 14 of the vehicle 10. The crush-cans 16 absorb energy from the front end impact of a front end collision by collapsing in an accordion, or telescoping, manner.

A deflector 18 is attached to the frame rail 14 behind the crush-can 16. The deflector 18 includes a front leg 20 that is secured to the frame rail 14. A rear rail 22 is disposed generally parallel to the front leg 20 and is connected through an intermediate leg 24 to the front leg 20. The rear leg 22 extends rearwardly and inwardly from the intermediate leg 24 toward the frame rail 14. The rear leg 22 is not secured to the frame rail 14.

An anchor leg 26 is attached to the frame rail 14 and in some embodiments may be received with an opening 28 defined by the frame rail 14. The opening 28 may be fully defined by the frame rail 14 or may be defined by an open area in the front end of the frame rail 14. The anchor leg 26 may be welded or bolted to the frame rail 14.

A front end 30 of the front leg 20 extends forwardly and outwardly from the frame rail 14 to a location that is in front of the point at which the crush-can 16 is attached to the frame rail 14 to provide advance engagement. By extending in front of the crush-can 16, the deflector 18 is disposed to contact the rigid barrier in the small overlap rigid barrier test at an earlier point in time than if the deflector is disposed at a location even with or rearward of the crush-can 16. By moving the deflector 18 forward, additional time is provided for absorbing energy and reducing intrusions into the passenger compartment.

A back end 32 of the rear leg 22 is spaced from, but faces, the side of the frame rail 14. The spaced location of the back end 32 reduces any potential interference with the function of front end collision absorbing crush-cans 16 in a full-frontal collision test. The rear leg 22 in a small overlap rigid barrier test is driven into engagement with the side of the frame rail 14. A portion of the impact force is applied in a transverse direction through the rear leg to the side of the frame rail 14.

A front triangular plate 34 is secured to a first intersection 36, or first V-shaped portion. The front triangular plate 34 is secured to the front leg 20 and intermediate leg 24 to hold the intermediate leg 24 at approximately a right angle relative to the front leg 20. A rear triangular plate 38 is provided at a second intersection 40, or second V-shaped portion. The rear triangular plate is horizontally disposed and is connected to the intermediate leg 24 and rear leg 22 to hold the rear leg 22 at approximately a right angle to the intermediate leg 24. The front triangular plate 34 and rear triangular plate 38 are disposed in a horizontal plane and hold the front leg 20, rear leg 22 and intermediate leg 24 in the desired orientation. Alternatively, a rectangular plate could be provided instead of the two triangular plates 34 and 38 that would connect the front leg 20, intermediate leg 24 and rear leg 22.

Figure 3:
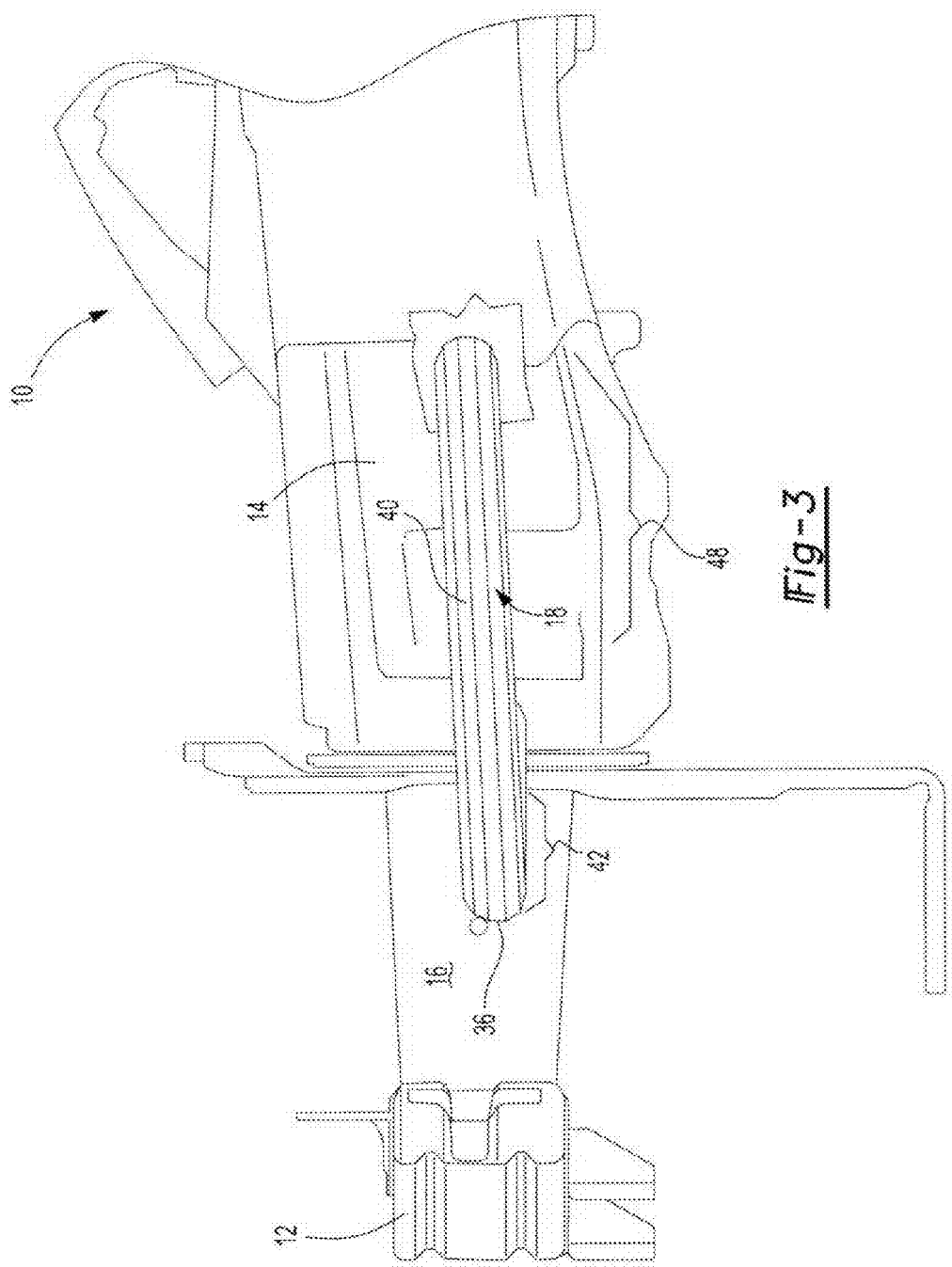
FIG. 3 is a side elevation view of the deflector attached to the front end of a frame rail of a vehicle that is oriented for advanced engagement with a small overlap rigid barrier.

Referring to FIG. 3, the orientation of the deflector 18 is described further by referring to functional portions of the structure. A vehicle 10 including the bumper 12 and the frame rail 14 are illustrated. Crush-cans 16, or other collision absorbing structures, are provided between the bumper 12 and the frame rail 14. An advanced engagement portion 42 of the deflector 18 is shown disposed in front of the location where the crush-cans 16 are attached to the frame rails 14. The advanced engagement portion is a portion of the deflector 18 that is initially contacted in a small overlap rigid barrier collision test. The advanced engagement portion 42 is connected by an attaching portion comprising part of the front leg 20 and the anchoring portion 26 (shown in FIG. 1) to the front portion of the frame rail 14 and may be received in an opening 28 defined by the frame rail 14, as previously described.

A small overlap collision support portion 48 is disposed behind the engagement portion 42. The small overlap collision support portion 48 comprises the rear leg 22 that is described with reference to FIGS. 1 and 2 above. The support portion 48 supports the engagement portion 42 in a collision with a rigid barrier 50 that is located in longitudinal alignment with the deflector 18. The impact with the engagement portion 42 is partially transferred to the side of the frame rail 14 when the support portion 48 is driven into the side of the frame rail 14. Part of the collision impact force is also absorbed by deformation of the engagement portion 42 and the small overlap collision support portion 48. The engagement portion 42 includes the V-shaped portion 36. The second V-shaped portion 40, as illustrated, is disposed between the engagement portion 42 and the support portion 48.

Figure 4:
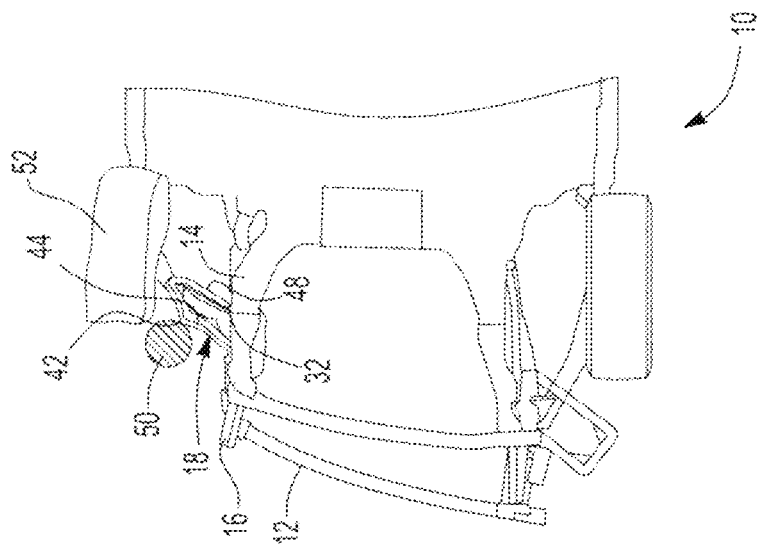
FIG. 4 is a fragmentary bottom plan view of a vehicle just prior to engagement with a small offset rigid barrier.
Figure 5:
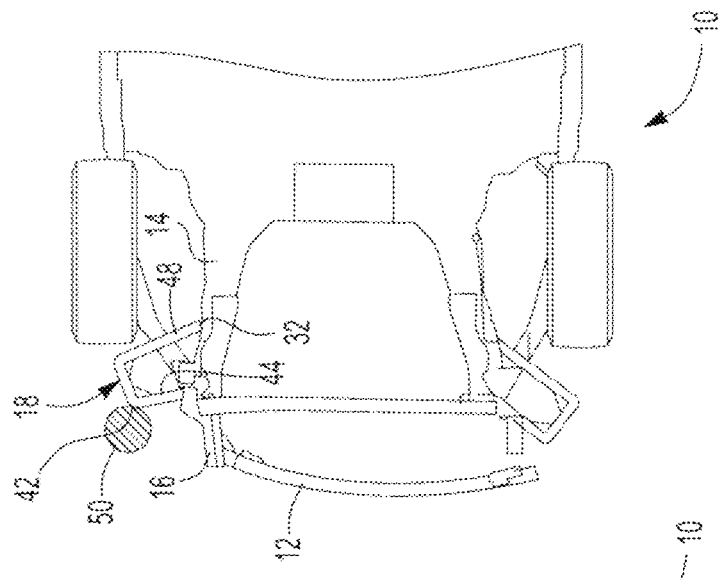
FIG. 5 is a fragmentary bottom plan view of a vehicle just 20 milliseconds after contacting a rigid barrier in a small overlap rigid barrier test.
Figure 6:
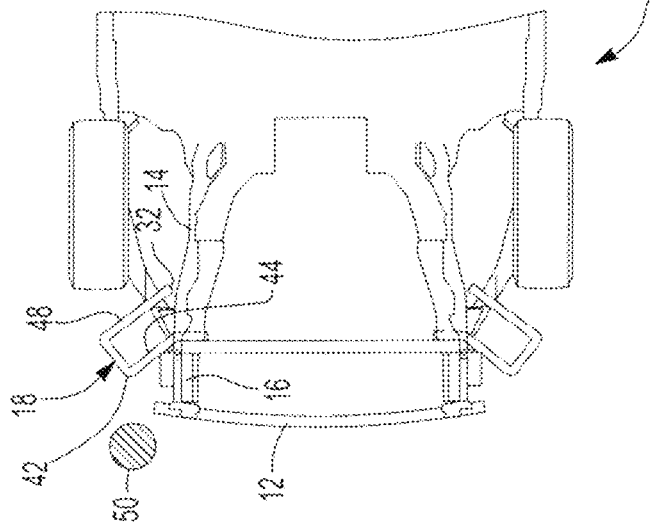
FIG. 6 is a fragmentary bottom plan view of a vehicle 45 milliseconds after contacting a rigid barrier in a small overlap rigid barrier test.

Referring to FIGS. 4-6, a simulated small overlap rigid barrier test is shown in sequence. FIG. 4 represents the 0 millisecond, or pre-collision condition, of the vehicle including the deflector 18. FIG. 5 represents the vehicle in the small overlap rigid barrier test at 20 milliseconds. FIG. 6 represents the vehicle in the small overlap rigid barrier test at 45 milliseconds.

Referring to FIG. 4, the vehicle 10 is shown with the rigid barrier 50 just prior to contacting the vehicle. The deflector 18 is attached to the front end of the frame rail 14. The back end 32 of the support portion 48 is shown slightly spaced from the frame rail 14. The engagement portion 42 is disposed in front of the frame rail 14 and outboard of the crush-cans 16.

Referring to FIG. 5, the vehicle 10 is shown with the bumper 12 having moved passed the barrier 50. The deflector 18 is shown after initially engaging the barrier 50. The back end 32 of the support portion 48 is shown being driven into the side of the frame rail 14. The barrier 50 at this point moves the engagement portion 42 slightly rearwardly.

Referring to FIG. 6, the vehicle 10 is shown at 45 milliseconds after impact. At this point, the rigid barrier 50 drives the deflector 18 in a rearward direction with the engagement portion 42 being disposed between the frame rail 14 and the tire and wheel assembly 52. Collision energy has been absorbed by deformation of the deflector 18 and also by driving the back end 32 of the support portion 48 into the side of the frame rail 14.

Figure 7:
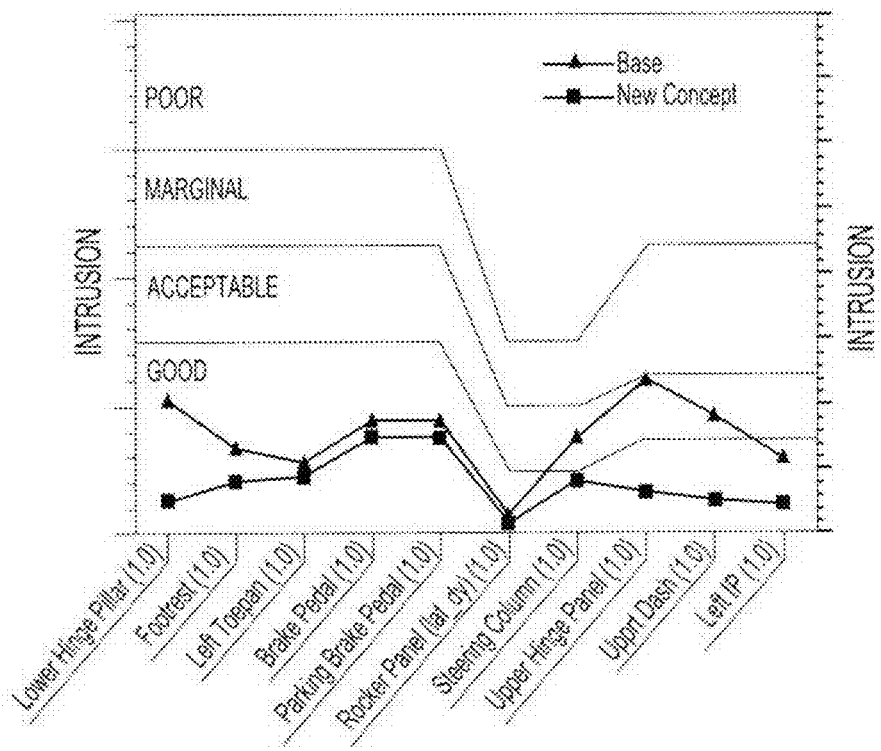
FIG. 7 is a chart of intrusion measurements in a simulated small offset rigid barrier test showing the extent of intrusion into a passenger compartment at specified measurement locations.

Referring to FIG. 7, a chart of the intrusion measurements of a small overlap rigid barrier test is shown with the line including triangles indicating the intrusion measurements for a base design. The front intrusion measurements are plated for the new concept disclosed in this application that has the engagement portion 42 moved to an advanced engagement position in front of the frame rail and outboard of the crush-cans. The base model included three acceptable measurements with one measurement at the upper hinge panel of the base model being just slightly less than at the marginal intrusion level. Substantial improvement is indicated for the new concept at the lower hinge pillar and foot rest area, as well as at the steering column, upper hinge panel, upper right dash and the left instrument panel. In all instances, the extent of intrusion for the new concept is indicated to be in the good range.

Figure 8:
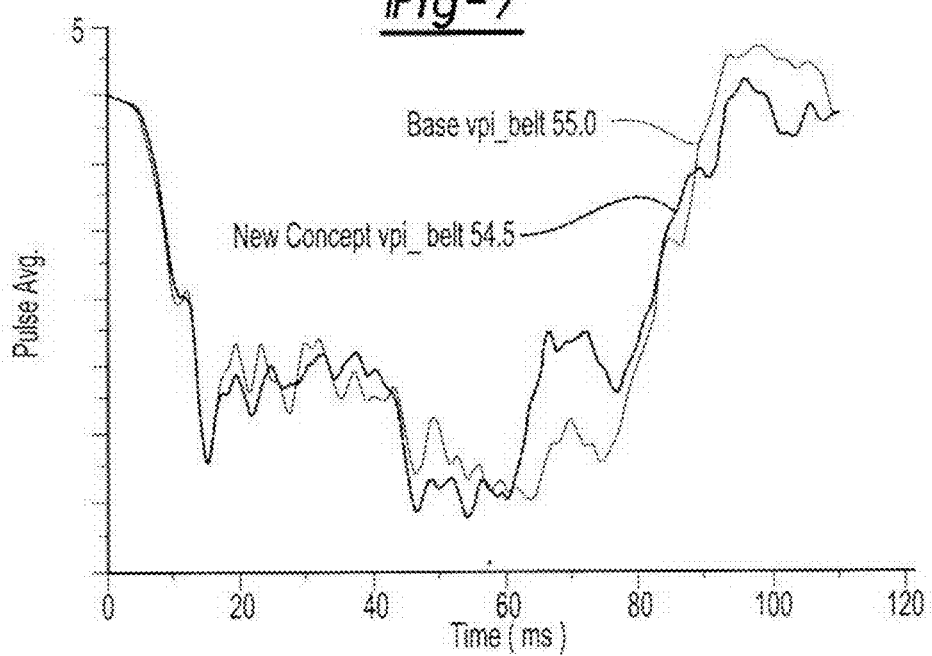
FIG. 8 is a graph of pulse averages for a full frontal rigid barrier test at 35 MPH comparing a base vehicle pulse index to a vehicle provided with the deflector shown in FIGS. 1-6 above during the test.

Referring to FIG. 8, a chart of the average pulse over time in a full frontal rigid barrier test is illustrated. The base design is indicated by the thin solid line. The new concept disclosed in this application is illustrated by the heavier dashed line. The vehicle pulse index is slightly reduced from 55 to 54.5 on average. This chart verifies that the addition of the deflector does not interfere with or materially affect the vehicle pulse index in the full front rigid barrier test.

While exemplary embodiments are described above, it is not intended that these embodiments describe all possible forms of the disclosure. The words used in the specification are words of description rather than limitation. Changes may be made to the illustrated embodiments without departing from the spirit and scope of the disclosure as claimed. The features of the illustrated embodiments may be combined to form further embodiments of the disclosed concepts.

What is claimed is:

1. A deflector for a vehicle having a bumper connected to a longitudinally extending frame rail through a crush-can comprising:
   a front leg attached to the frame rail adjacent the crush-can and extending forward of the frame rail;
   an intermediate leg attached to a front end of the front leg and extending in a rearward and outward direction; and
   a rear leg extending from an outer end of the intermediate leg toward the frame rail.

2. The deflector of claim 1 wherein the rear leg has a back end that is not attached to the frame rail and is disposed adjacent the frame rail.

3. The deflector of claim 1 wherein the front leg extends toward a front outer corner of the vehicle.

4. The deflector of claim 1 wherein the front leg extends at an oblique angle relative to the frame rail to a point laterally outboard of the crush-can that is rearward of the bumper.

5. The deflector of claim 4 wherein the intermediate leg is attached at a right angle to the front leg and to the rear leg.

6. The deflector of claim 5 wherein a front triangular plate disposed in a horizontal plane is attached to the deflector at a first intersection joining the front leg and the intermediate leg, and a rear triangular plate disposed in the horizontal plane is attached at a second intersection joining the intermediate leg and the rear leg.

7. A deflector for a vehicle having a longitudinal frame rail and a bumper, the deflector comprising:
   a front leg attached at a location in longitudinal alignment with the frame rail;
   an intermediate leg attached to the front leg to form a first V-shape portion of the deflector disposed outboard and forward of the frame rail; and
   a rear leg extending toward the frame rail and forming a second V-shaped portion with the intermediate leg.

8. The deflector of claim 7 wherein the rear leg has a back end that is not attached to the frame rail and is disposed adjacent the frame rail.

9. The deflector of claim 7 wherein the front leg extends at an oblique angle relative to the frame rail to a point laterally outboard of a crush-can disposed between the bumper and the frame rail, wherein the point is rearward of the bumper.

10. The deflector of claim 7 wherein a front triangular plate disposed in a horizontal plane is attached to the deflector at a first intersection joining the front leg and the intermediate leg, and a rear triangular plate disposed in the horizontal plane is attached at a second intersection joining the intermediate leg and the rear leg.

11. A deflector for a vehicle having a bumper connected to a frame rail through a crush-can, the deflector comprising:
   an engagement portion extending laterally outward and forward of a front end of the frame rail;
   an attaching portion attached to the engagement portion and a front location on the frame rail behind the crush-can; and
   a small overlap collision support portion extending from the engagement portion toward a collision loading location on the frame rail behind the front location.

12. The deflector of claim 11 wherein the small overlap collision support portion has an end facing the collision loading location on the frame rail that is driven into engagement with the frame rail in a collision with an object that is longitudinally aligned with the deflector.

13. The deflector of claim 12 wherein the end of the small overlap collision support portion is oriented not to be driven into the frame rail in a frontal collision.

14. The deflector of claim 11 wherein an impact force applied in a collision with an object longitudinally aligned with the deflector is applied to the engagement portion, and wherein the impact force is partially applied in a transverse direction through the small overlap collision support portion to the frame rail.

15. The deflector of claim 14 wherein an impact force applied in a collision with an object longitudinally aligned with the deflector is applied to the engagement portion, and wherein the impact force is partially absorbed by deformation of the engagement portion.

16. The deflector of claim 11 wherein the engagement portion extends toward a front outer corner of the vehicle.

17. The deflector of claim 11 wherein a plate disposed in a horizontal plane is attached to the deflector and interconnects the engagement portion and the small overlap collision support portion.

18. The deflector of claim 11 wherein a plate disposed in a horizontal plane is attached to the deflector and interconnects the engagement portion and the attaching portion.

19. The deflector of claim 11 further comprising an anchor leg provided on the attaching portion and connected to the front location of the frame rail and behind the crush can.

20. The deflector of claim 19 wherein the frame rail defines an opening and the anchor leg is assembled into the opening defined by the frame rail, and wherein the anchor leg is secured to the frame rail by the anchor leg.

* * * * *